Aug. 5, 1947. J. C. NEEDHAM 2,425,160
ELECTRICAL FOLLOW-UP SYSTEM
Filed Oct. 3, 1944 3 Sheets-Sheet 1

Inventor
John C. Needham
By Ralph B. Stewart
Attorney

Aug. 5, 1947.            J. C. NEEDHAM            2,425,160
                   ELECTRICAL FOLLOW-UP SYSTEM
                     Filed Oct. 3, 1944        3 Sheets-Sheet 3

Inventor
John C. Needham
By Ralph B. Stewart
Attorney

Patented Aug. 5, 1947

2,425,160

UNITED STATES PATENT OFFICE 2,425,160

ELECTRICAL FOLLOW-UP SYSTEM

John Cuthbert Needham, London, England, assignor to Evershed and Vignoles Limited, London, England, a company of Great Britain Application October 3, 1944, Serial No. 557,028
In Great Britain November 12, 1943

9 Claims. (Cl. 318—29)

This invention relates to electrical control apparatus and, more precisely speaking, to the control of an appliance which is driven by an electric motor so as to follow-up regular or intermittent movements of an initiating device. The invention is concerned with such apparatus in which an electric motor, which can usually exert considerable power, is controlled in accordance with out-of-step conditions between the controlled appliance and the initiating device.

In some such systems, it is necessary for the control to be effected by a device which cannot exert any appreciable amount of power. Thus, the movable member of a sensitive moving coil relay may move in one direction or the other to a limited amount when the initiating device moves one way or the other. In such a case, that movable member is able to close and interrupt circuits carrying small currents but is not capable of operating directly a reversing switch such as is necessary to give rise to rotation of the power motor in either sense.

The object of the invention is to produce a simple and robust form of relay mechanism controlled by a delicate member such as the moving member of a sensitive relay, and which in its turn, operates the reversing switch or the equivalent for the power electric motor, while, at the same time, causing movements of the motor which are not extremely violent.

According to the present invention, contacts are actuated upon movement of the initiating device in each of its directions of movement, which contacts control the circuit of power relay devices which themselves operate the controlling switch or equivalent for the power motor, and which are also associated with the contacts actuated upon movement of the initiating device in such a way that the contact made is of a transient nature, at any rate when the system is near the balanced condition, with the result that the impulses imparted to the power motor when the controlled appliance is nearly in step with the initiating device, comprise a series of small impulses in the required direction rather than a single violent impulse. This tends towards smooth running and avoidance of over-running, with the result that tendency towards hunting and damage of the mechanical parts is avoided. The initiating device may be arranged to cause actuation of a light and delivate contact-bearing member, when moved in either direction, to close the circuit of one of a pair of power relay devices whose armatures are associated with the contacts which are closed in such a way as to tend to cause the contacts to open again when the respective power relay winding is energised. This results in a shaker or trembler action producing intermittent or transient contact on one side or the other according to the direction of movement. Conveniently, the armatures of the power relay devices may be embodied in a single rocking member which carries what would normally be the "stationary" contacts.

The spindle of the rocking armature may carry the actuating member of the reversing switch for the power electric motor. The actuating member may be arranged so that when rocked in one direction, it opens two contacts and leaves two other contacts closed, and when rocked in the other direction, it leaves the first-mentioned two contacts closed and opens the other two, while when in the neutral position, it allows all four contacts to remain closed, under which conditions the armature of the power motor is short-circuited and rapidly comes to rest. If the motor has its field permanently connected across a source of direct current supply, it may be arranged that the rocking member and the four pairs of contacts which it actuates serve as a reversing switch in respect of the armature of the motor.

In order that the invention may be clearly understood and readily carried into effect, an example of the novel control apparatus will now be described with reference to the accompanying drawings, in which—

Figure 3 is a side elevation seen from the left of Figure 2 and showing the motor reversing switch; while

Figure 4:
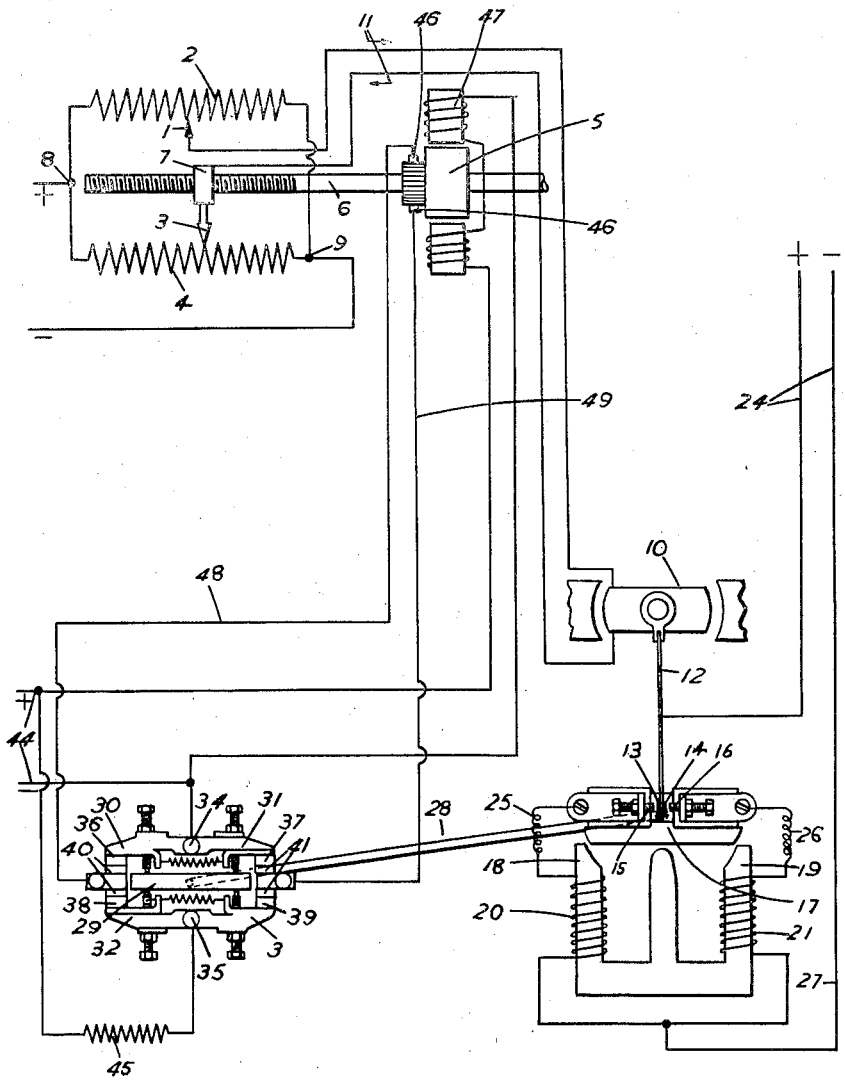
Figure 4 is a diagram of connections.

As shown diagrammatically in Figure 4, the initiating device consists of a sliding contact 1 which may be shifted along a resistance 2 either by hand or a light mechanical movement which does not exert much power. The controlled appliance is another contact 3 moved along another resistance 4 by the power electric motor whose armature is shown at 5. The arrangement is shown diagrammatically with the shaft of the motor 6 formed as a lead screw engaging a nut 7 which carries the controlled contact 3. The resistance 2 constitutes two arms of a Wheatstone bridge, and the resistance 4 the other two arms, the bridge being supplied with direct current at the opposite points 8, 9, and the contacts 1 and 3 being connected to the moving coil 10 of a galvanometer so that current flows through the coil 10 when the bridge is out of balance in a direction depending upon the position of the initiating contact 1 to one side or the other of the position corresponding to that of the controlled contact 3. In Figure 4, the initiating contact 1 is shown as having been moved somewhat to the left so that it is at a potential which is slightly positive to that of the controlled contact 3 and current is flowing through the moving coil 10 in the direction indicated by the arrows 11.

Figure 1:
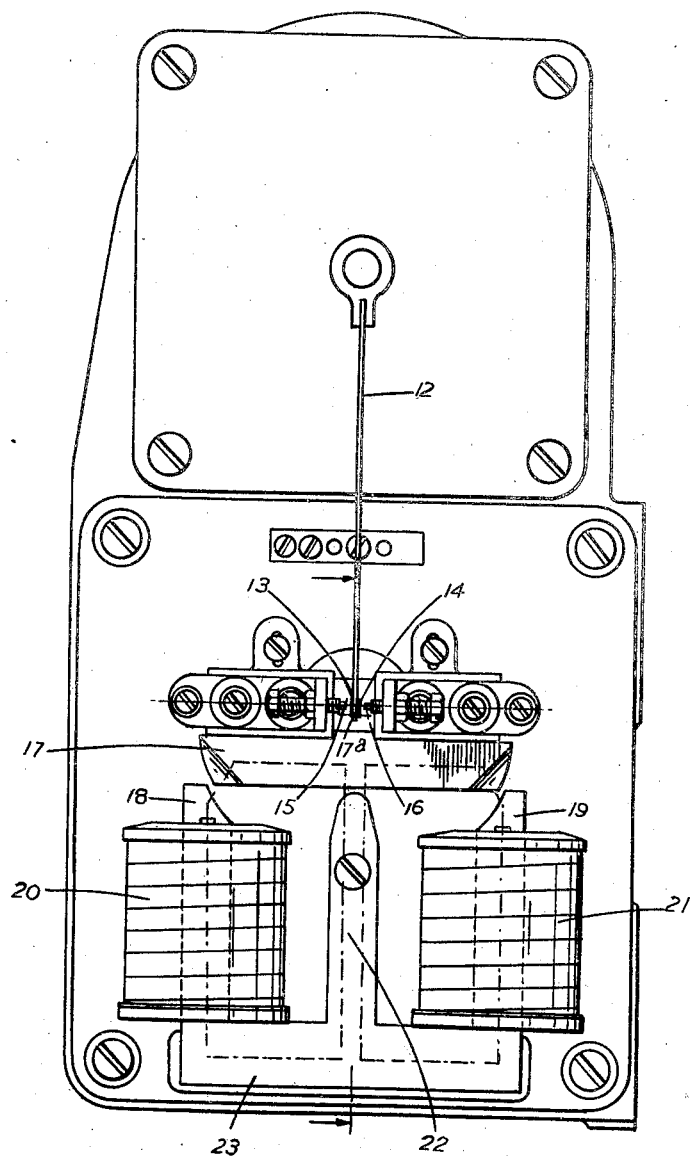
Figure 1 is an end elevation of the apparatus.

The pointer 12 of the galvanometer also shown in Figures 1 and 2, carries near its lower end contacts 13, 14 on opposite sides each co-operating with one of a pair of adjustable contacts 15, 16, which may be regarded as stationary except for the shaker movement imparted to them by the power relay armature 17 as will be described below.

The armature 17 is a pivoted bar bearing the contacts 15, 16 at a position a small distance above its axis of oscillation 17a so that as the armature 17 rocks, the contacts 16, 16 have a lateral component of movement. In practice, the distance between the axis 17a and the centre line of the contacts 15, 16 would be only a few thousandths of an inch and is somewhat exaggerated in Figures 1 and 2 for the sake of clarity. The armature 17 co-operates at either end with the side limbs 18, 19 of the relay core. In fact, as shown in the example, two power relays having windings 20, 21 are incorporated in a common structure comprising the two side limbs 18, 19 and a central limb 22 connected with the side limbs 18, 19 by a yoke 23 connecting the lower ends of the limbs 18, 19, 22. The power windings 20, 21 can be seen as surrounding the side limbs 18, 19. Thus, the magnetic circuit of each of the relay elements passes through the respective side limb 18 or 19, through one half of the yoke 23, through the central limb 22, and returning through one half of the armature 17 and the air gap to the side limb 18, 19, as shown in chain lines in Figure 1. As only one of the windings 20, 21 can be energised at one time from a source of supply 24 through either the contacts 13 and 15, or the contacts 14 and 16, the armature 17 is rocked in the clockwise or counter-clockwise direction according to the relative positions of the contacts 1 and 2. The contacts 15, 16 are joined by flexible connections 25, 26 to the upper end of the respective winding 20, 21, the lower ends of which are connected together and through a conductor 27 to the negative side of the source 24.

When the initiating contact 1 is moved to one side or the other as in Figure 4, the current flows through the moving coil 10 as described, the pointer 12 moves in one direction or the other so that the contacts 13 and 15 or 14 and 16 are closed. This completes the circuit from the source 24 referred to above, and assuming that the winding 20 is energised, the armature 17 is attracted by the limb 18 and rocked counter-clockwise, and as a result, if the deflection of the pointer 12 does not exceed a certain amount, the contact 15 is momentarily withdrawn from the contact 13, with the result that the circuit of the winding 20 is momentarily interrupted and the relay de-energized, so that the armature 17 returns to close the contacts 13, 15 again. This continues, setting up a rapid shaker or trembler action until, in the way which will be described below, the controlled contact 3 is moved by the motor 5 to a position corresponding to that of the initiating contact 1, when the bridge 2, 4 will be balanced, no current will flow through the moving coil 10, and the pointer 12 will assume its central position with the relay armature 17 in the horizontal position and with the contacts 15, 16 just clear of the movable contacts 13, 14. However, if the bridge 2, 4 is considerably out of balance, the deflection of the galvanometer pointer 12 may be such that the contacts 13, 15 or 14, 16 are not opened until the motor 5 brings the bridge nearly into balance. Just before this takes place, the shaker action described above will be set up so that the power motor 5 can complete its final movement to balance the bridge 2, 4 in a relatively gentle manner without risk of overrunning.

Figure 2:
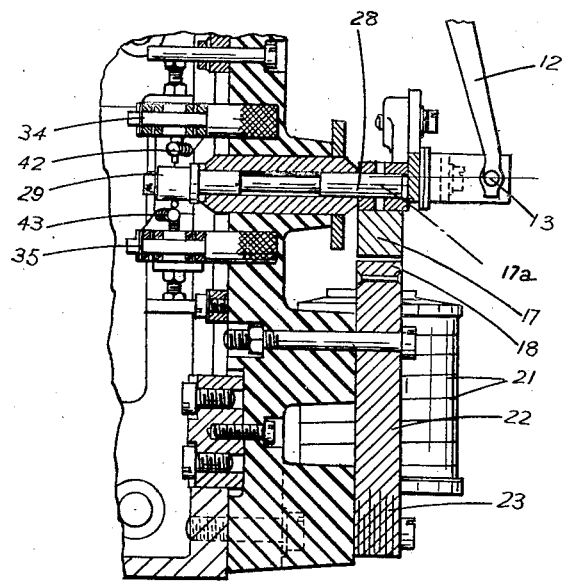
Figure 2 is a vertical central section seen in the direction of the arrows in Figure 1, showing the electromagnets and the motor reversing switch.

The spindle 28 of the armature bar 17 is extended to the left in Figure 2 and has fixed to it a rocking bar 29 (Figures 2, 3 and 4) which constitute the actuating member of the reversing switch for the power motor 5. In the example illustrated, the reversing switch has pairs of independently movable arms 30, 31, 32, 33, the arms 30 and 31 being pivoted at a point 34 above the axis of the switch actuating bar 29, and the arms 32, 33 being pivoted at a point 35 below that axis. Each of the arms 30, 31, 32, 33 bears at its outer end a butt contact 36, 37, 38, 39, which may be faced with tungsten. These contacts 36, 37, 38 and 39 engage respectively with the upper and lower faces of a pair of fixed contact members 40, 41. When the actuating bar 29 is in the horizontal or neutral position shown in Figure 3, and has no action on the arms 30, 31, 32, 33, all four of the pairs of butt contacts 36, 40, 37, 41, 38, 40, and 39, 41 are closed as seen in Figure 3 by means of a pair of tension springs 42, 43, the ends of which are anchored respectively to projections integral with the arms 30, 31 and 32, 33.

Figure 3:
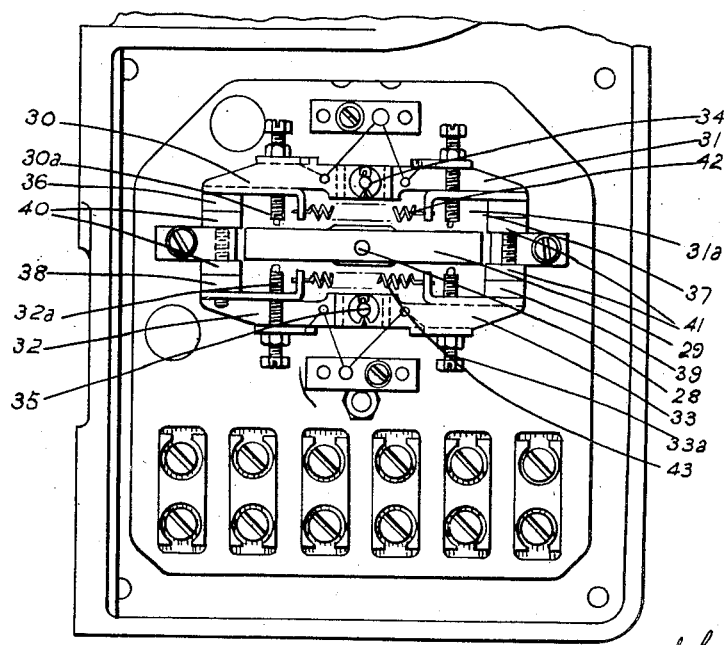

When the relay armature 17 is rocked as described above, say counter-clockwise, as seen in Figures 1 and 4, the switch actuating bar 29 will also be rocked, in fact, in the clockwise direction as seen in Figure 3, and it is necessary then for it to open the contacts 36, 40 and the contacts 39, 41, while the other contacts 37, 41, and 38, 40 are held closed by the springs 42, 43. To provide for this and to allow of adjustment, each of the arms 30, 31, 32, 33 carries an adjustable set screw 30a, 31a, 32a, 33a, the point of which extends down close to the upper or lower surface of the switch actuating bar 29, but with slight clearance as seen in Figures 2 and 3, when the bar 29 is in its horizontal position. This adjustment with slight clearance allows all the butt contacts to be closed when the bar 29 is horizontal as shown in Figure 3, by means of the springs 42, 43. When, however, the bar 29 is rocked, for instance clockwise, it engages the screws 30a and 33a, opening the contacts 36, 40 and 39, 41, as already described, but allowing the springs 42, 43 to hold the contacts 37, 41 and 38, 40 closed. If the bar 29 is rocked in the other direction, the last-mentioned contacts 37, 41, 38, 40, are opened, and the contacts 36, 40, and 39, 41 are held closed.

The source of supply 44 for the power motor 5 is connected on the positive side through a resistance 45 to the pivot 35 of the contact arms 32, 33, and on the negative side to the pivot 34 of the contact arms 30, 31 as shown in Figure 4, and if desired a resistance similar to the resistance 45 may be connected between the pivot 34 and the negative side of the source 44. The purpose of the resistance 45 is to avoid short-circuiting of the source 44 when all four pairs of butt contacts are closed, as shown in Figure 3. The armature brushes 46 of the power motor 5 are directly connected across the two fixed contact members 40, 41 and the field winding 47 of the power motor 5 is constantly energised by being connected directly across the source of supply 44.

It will now be easily understood that the operation of the system is as follows. When the switch actuating bar 29 is in the neutral or horizontal position, all four pairs of butt contacts 36, 40, 37, 41, 38, 40, and 39, 41 are closed so that the armature 5 of the power motor is short-circuited by parallel connections, one of which includes the contacts 40, 36, 37, 41, and the other includes the contacts 40, 38, 39, 41, so that if the motor 5 is rotating, it is rapidly brought to rest by electromagnetic braking. If the switch actuating bar 29 is rocked, for example, in the clockwise direction as seen in Figure 3 so as to open the contacts 36, 40, and the contacts 39, 41, leaving the contacts 38, 40, and 37, 41 closed, the armature 5 of the power motor is connected across the source 44 through the resistance 45, contacts 38, 40, and through the conductor 48 on the one hand, and through the contacts 37, 41 and the conductor 49 on the other hand, so that current flows in at the upper commutator brush 46 and out through the lower brush 46. The power motor whose speed depends on the voltage of the source 44 and the value of the resistance 45, drives the controlled contact 3 at a reasonable speed in a direction to bring it in the position corresponding to that at which the initiating contact 1 has been set. It will also be realised that if the initiating contact 1 had been moved in the opposite direction, the galvanometer pointer 12 would be deflected in the opposite direction and the relay armature 17 would rock the switch actuating bar 29 counter-clockwise so as to open the contacts 37, 41, and 38, 40. Then the positive side of the source of supply 44 would be connected through the resistance 45, contacts 39, 41, conductor 49, to the brushes 46, the circuit returning through the conductor 48, contacts 36, 40, to the negative side of the source 44, so that the power motor would turn in the opposite direction and drive the controlled contact 3 in the opposite direction until it reached the position corresponding to that of the initiating contact 1. If the movement of the initiating contact 1 is relatively small, a relatively small current would pass through the moving coil 10 and the deflection of the pointer 12 would not be very vigorous so that as soon as the contacts 13, 15, or 14, 16 were closed, the contact 15 or 16 would be retracted by the relay armature 17 setting up the rapid shaker or trembler action already described. If, however, the initiating contact 1 were suddenly moved by a considerable amount, the galvanometer pointer 12 might be deflected so much as to prevent the immediate opening of the contacts 13, 15, or 14, 16, so that for the time being the trembler action would not take place and the switch actuating bar 29 would be held over in one extreme position and the power motor armature 5 would rotate continuously until the controlled contact 3 approached the balanced position. On approaching that position, the contacts 13, 15, or 14, 16, would open with the shaker or trembler action already described, and the motor armature 5 would be rapidly connected and disconnected to the source of supply 44 by receiving a series of transient impulses, with the result that the motor would drive the controlled contact 3 gently in the required direction to complete the balance of the bridge 2, 4 with practically no tendency to overrun because the movement of the controlled contact 3 would in fact consist of a series of rapidly succeeding movements of small amplitude. As already described, when the controlled contact 3 reaches the position corresponding to that in which the initiating contact 1 has been set, the bridge 2, 4 becomes balanced. The relay windings 20, 21 are disconnected by the galvanometer pointer 12 and the armature 5 of the power motor remains short-circuited because the switch actuating bar 29 is in the neutral or horizontal position and the armature 5 is brought immediately to rest by powerful electromagnetic braking and the parts remain stationary until the initiating contact 1 is moved again.

I claim:

1. In an electrical follow-up system, the combination of an initiating device, a controlled appliance, a reversible electric motor in driving relationship with said controlled appliance, a reversing switch connected to reverse said motor, a reversible electro-magnetic relay in operative connection with said reversing switch and bearing windings which respectively, on being energised, cause actuation of the moving element of said relay in opposite directions and pairs of contacts respectively in circuit with the windings of said relay, said pairs of contacts being associated with said initiating device so as to be closed respectively upon movement of said initiating device in each of the opposite directions to energise one or other of the windings of said relay and being in operative connection with the moving element of said relay so that the closure of each of said pairs of contacts and the consequent actuation of said reversing switch are of a transient nature causing short impulses to be imparted to said electric motor.

2. In an electrical follow-up system, the combination of an initiating device, a controlled appliance, a reversible electric motor in driving relationship with said controlled appliance, a reversing switch connected to reverse said motor, a reversible electro-magnetic relay in operative connection with said reversing switch and bearing windings which respectively, on being energised, cause actuation of the moving element of said relay in opposite directions and pairs of contacts respectively in circuit with the windings of said relay, said pairs of contacts being associated with said initiating device so as to be closed respectively upon movement of said initiating device in each of the opposite directions to energise one or other of the windings of said relay and being mounted on the moving element of said relay so that each pair of contacts on being closed is reopened upon the resulting energisation of said relay so that energisation of said relay and the consequent actuation of said reversing switch are of a transient nature causing short impulses to be imparted to said electric motor.

3. In an electrical follow-up system, the combination of an initiating device, a controlled appliance, a reversible electric motor in driving relationship with said controlled appliance, a reversing switch connected to reverse said motor, a pair of electro-magnetic relays both in operative connection with said reversing switch so as respectively on being energised to actuate said switch in opposite directions and two pairs of contacts each in circuit with the winding of one of said relays, said pairs of contacts being associated with said initiating device so as to be closed respectively upon movement of said initiating device in each of the opposite directions to energise one or other of said relays, and one of each pair of contacts being directly mechanically actuated by the moving element of one of said relays so that the closure of each of said pairs of contacts and the consequent actuation of said reversing switch are of a transient nature causing short impulses to be imparted to said electric motor.

4. In an electrical follow-up system, the combination of an initiating device, a controlled appliance, a reversible electric motor in driving relationship with said controlled appliance, a reversing switch connected to reverse said motor, a reversible electro-magnetic relay in operative connection with said reversing switch and bearing windings, which respectively, on being energised, cause actuation of the moving element of said relay in opposite directions, a pivoted contact member associated with said initiating device so as to be deflected in one direction or the other in dependance upon the direction of movement of said initiating device and a pair of co-acting contacts one on each side of said contact member and in operative connection with the moving element of said relay, said contact member and one of said co-acting contacts being in circuit with one of the windings of said relay so that the closure of said contact member with each of said co-acting contacts and the consequent actuation of said reversing switch are of a transient nature causing short impulses to be imparted to said electric motor.

5. In an electrical follow-up system, the combination of an initiating device, a controlled appliance, a reversible electric motor in driving relationship with said controlled appliance, a reversing switch connected to reverse said motor, a bridge network of impedances with opposite sliding contacts respectively operated by said initiating appliance and said electric motor, a reversible electro-magnetic relay in operative connection with said reversing switch and bearing windings which respectively, on being energised, cause actuation of the moving element of said relay in opposite directions, a galvanometer connected between said sliding contacts, a pair of moving contacts carried by the index of said galvanometer and a pair of co-acting contacts each co-operating with one of said moving contacts to energise one or other of the windings of said relay, said coacting contacts being in operative connection with the moving element of said relay so that the closure of one of said moving contacts with the associated co-acting contact and the consequent actuation of said reversing switch are of a transient nature causing short impulses to be imparted to said electric motor.

6. In an electrical follow-up system, the combination of an initiating device, a controlled appliance, a reversible electric motor in driving relationship with said controlled appliance, a reversing switch connected to reverse said motor and comprising a pair of stationary contacts and two pairs of pivoted contact arms with springs biasing said arms against said stationary contact and a pivoted switch actuating member arranged to separate an opposite pair of said contact arms from said stationary contacts, a source of electrical supply connected to opposite pairs of said contact arms, connections from said stationary contacts to said electric motor, a reversible electromagnetic relay in operative connection with said switch actuating member, and bearing windings which respectively, on being energised, cause actuation of the moving element of said relay in opposite directions and pairs of contacts respectively in circuit with the windings of said relay, said pairs of contacts being associated with said initiating device so as to be closed respectively upon movement of said initiating device in each of the opposite directions to energise one or other of the windings of said relay and being in operative connection with the moving element of said relay so that the closure of each of said pairs of contacts and the consequent actuation of said reversing switch are of a transient nature causing short impulses to be imparted to said electric motor.

7. In an electrical follow-up system, the combination of an initiating device, a controlled appliance, a reversible electric motor in driving relationship with said controlled appliance, a reversing switch connected to reverse said motor, and comprising a pair of stationary contacts and two pairs of pivoted contact arms with springs biasing said arms against said stationary contact and a pivoted switch actuating member arranged to separate an opposite pair of said contact arms from said stationary contacts, a source of electrical supply connected to opposite pairs of said contact arms, connections from said stationary contacts to said electric motor, a reversible electromagnetic relay in operative connection with said switch actuation member and bearing windings which respectively, on being energised, cause actuation of the moving element of said relay in opposite directions and pairs of contacts respectively in circuit with the windings of said relay, said pairs of contacts being associated with said initiating device so as to be closed respectively upon movement of said initiating device in each of the opposite directions to energise one or other of the windings of said relay and being mounted on the moving element of said relay so that each pair of contacts on being closed is reopened upon the resulting energisation of said relay so that energisation of said relay and the consequent actuation of said reversing switch are of a transient nature causing short impulses to be imparted to said electric motor.

8. In combination, a galvanometer having a contact arm carried by the movable element thereof and being movable in opposite directions from a normal position, a pair of spaced contacts arranged on opposite sides of said contact arm, a support for said spaced contacts mounted for limited movement transversely of said contact arm, a relay having an armature movable in opposite directions from a normal position, a pair of windings on said relay for operating said armature in opposite directions, circuit connections for energizing one or the other of said relay windings by engagement of said contact arm with one or the other of said spaced contacts to move said armature in one direction or the other, and a mechanical connection between said armature and said contact support for moving said contact support in a direction tending to disengage the engaged contact from said contact arm.

9. A combination according to claim 8 wherein said contact support is mounted directly upon the armature of said relay and moves therewith.

JOHN CUTHBERT NEEDHAM.

REFERENCES CITED

The following references are of record in the file of this patent:

UNITED STATES PATENTS

| Number | Name | Date |
| --- | --- | --- |
| 2,062,915 | Lamb | Dec. 1, 1936 |
| 2,264,987 | Kovalsky | Dec. 2, 1941 |
| 1,376,633 | Obermaier | May 3, 1921 |
| 2,277,653 | Evans | Mar. 24, 1942 |
| 1,784,504 | Tanner | Dec. 9, 1930 |